Aug. 8, 1939.　　　　M. IRELAND　　　　2,168,526
UNITARY THERMALLY RESPONSIVE TIMING MECHANISM
Filed March 1, 1937　　3 Sheets—Sheet 1
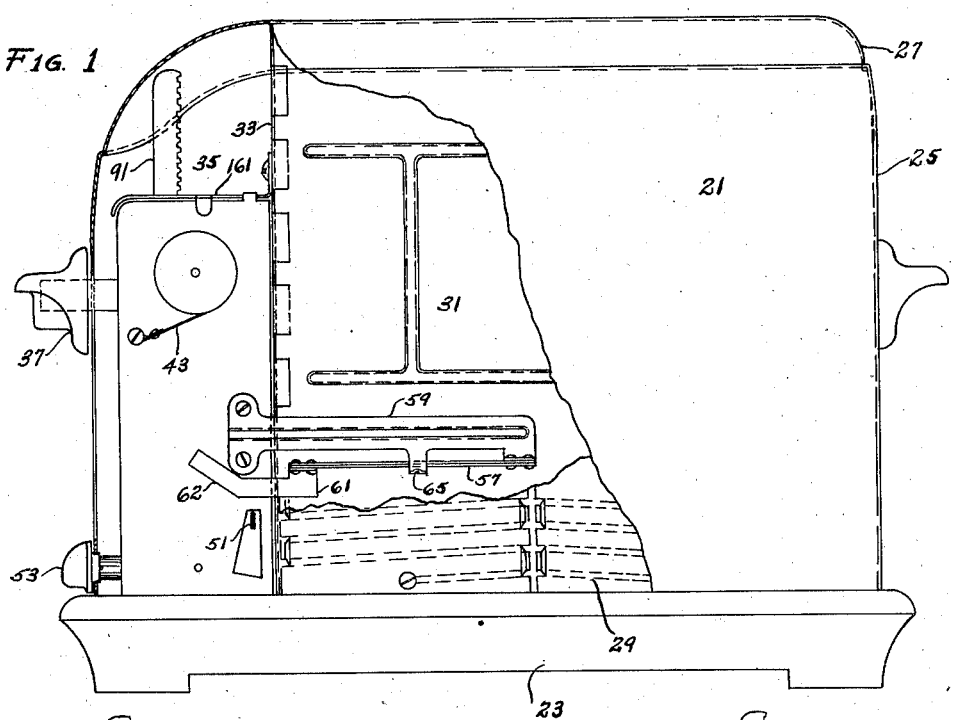
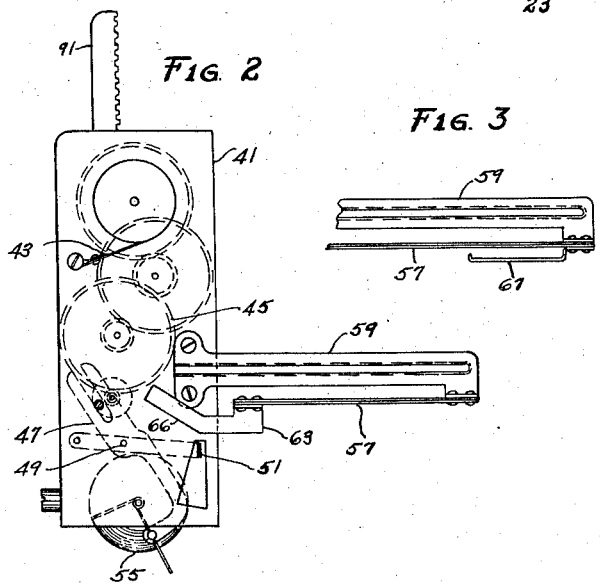
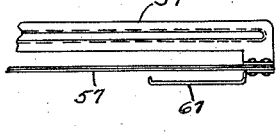
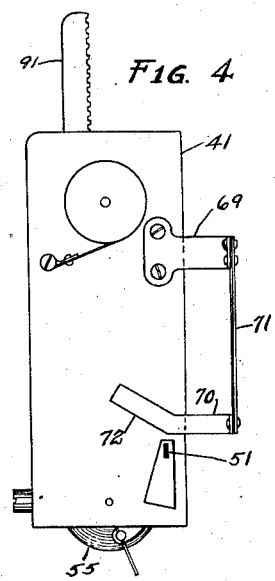
INVENTOR.
Murray Ireland
BY
ATTORNEYS.

Aug. 8, 1939. M. IRELAND 2,168,526
UNITARY THERMALLY RESPONSIVE TIMING MECHANISM
Filed March 1, 1937 3 Sheets-Sheet 2
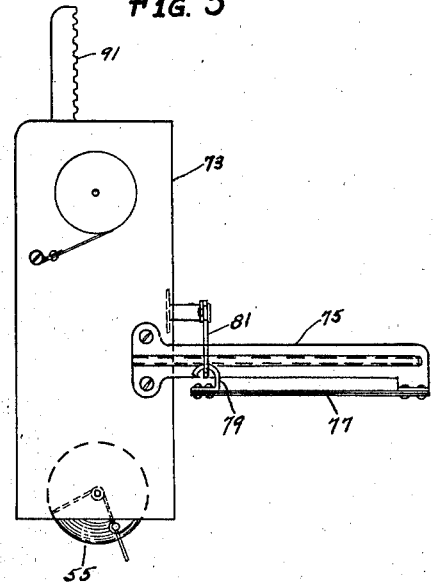
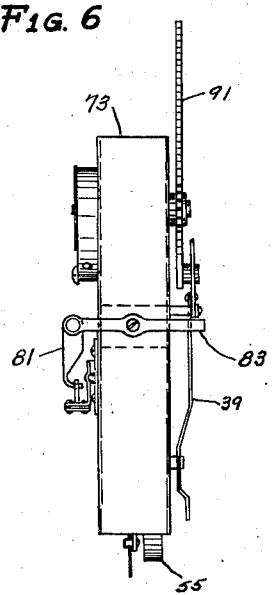
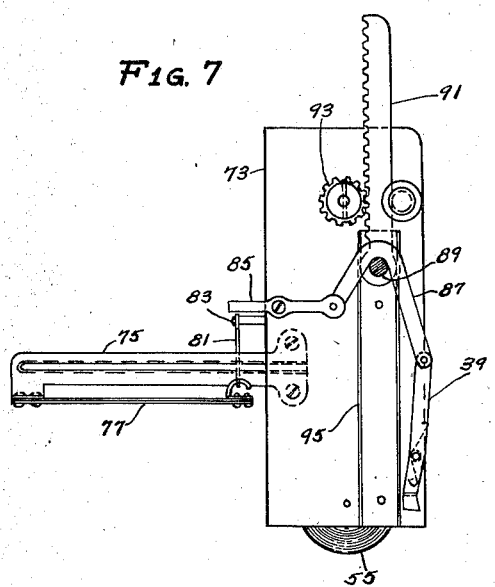
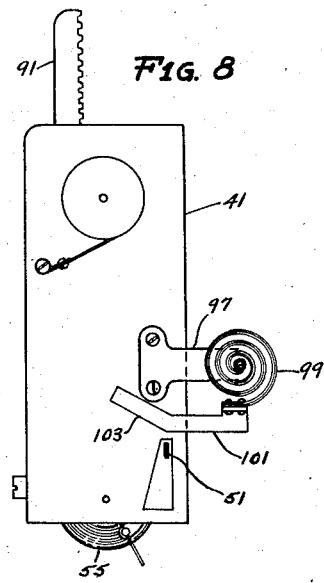
INVENTOR.
Murray Ireland
BY
ATTORNEYS.

Aug. 8, 1939.  M. IRELAND  2,168,526
UNITARY THERMALLY RESPONSIVE TIMING MECHANISM
Filed March 1, 1937  3 Sheets—Sheet 3
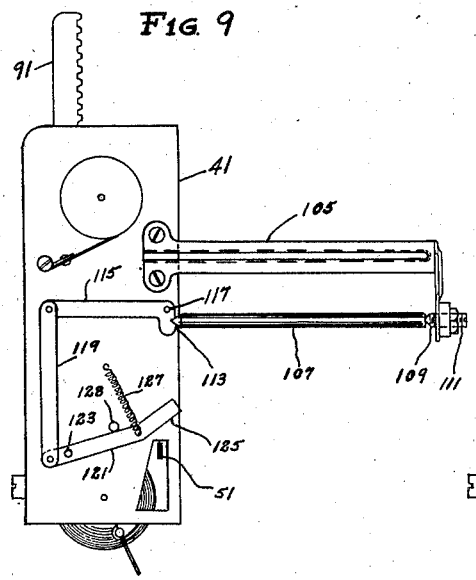
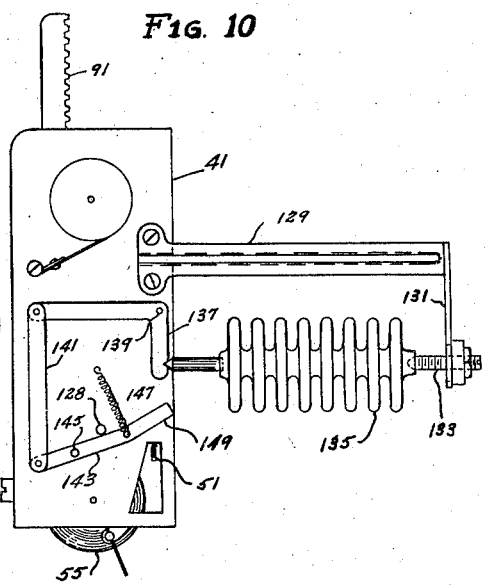
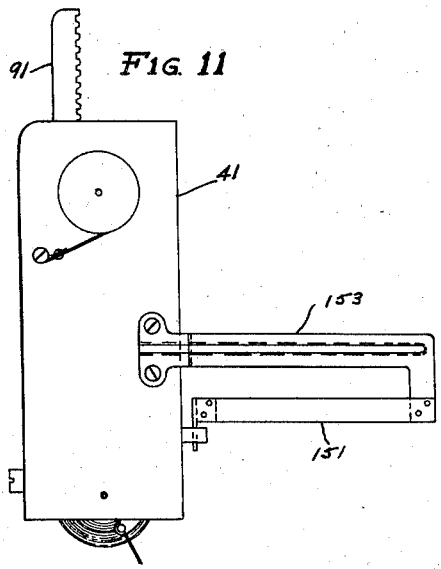
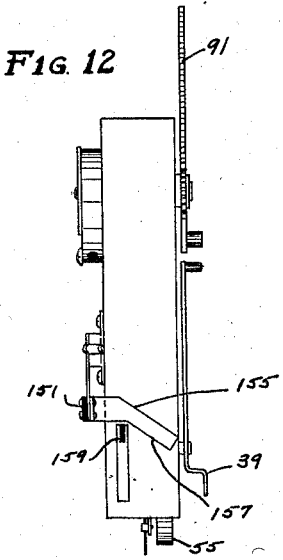
INVENTOR.
Murray Ireland
BY
ATTORNEYS.

Patented Aug. 8, 1939

2,168,526

UNITED STATES PATENT OFFICE 2,168,526

UNITARY THERMALLY RESPONSIVE TIMING MECHANISM

Murray Ireland, St. Paul, Minn., assignor to McGraw Electric Company, Chicago, Ill., a corporation of Delaware Application March 1, 1937, Serial No. 128,402

11 Claims. (Cl. 161—1)

My invention relates to thermally-responsive timing mechanisms and has for one of its objects to provide a unitary structure for a mechanism of this kind.

Another object of my invention is to provide a unitary thermally-responsive timing mechanism that shall be adapted for use with any heating or cooking device in which a thermally-controlled time period of operation is required.

Another object of my invention is to provide a timing mechanism of this kind to obtain a proportionate or disproportionate change of duration of an operating period of a heating or cooking appliance with change of temperature.

Other objects of my invention will either be apparent from a description of several forms of device embodying my invention or will be pointed out in the course of such description.

It is now well known that where a heating or a cooking appliance is successively operated a number of times for relatively short periods each time, as is usual in a toaster, the temperature of the appliance has an effect upon the duration of an operating period of the appliance, particularly when it is desired to obtain uniform results, such as uniform toasting, in successive operations irresective of the length of time intervals between the operating periods, and in spite of the rise of temperature of the appliance itself.

In prior toasters known to me, of the type embodying a mechanical timer and a thermally-responsive element cooperating with the timer to vary the time period of operation of a heating or cooking appliance, such as a toaster, the mechanical timer was built up as one unit while the thermally-responsive element was made as a separate unit and was usually supported by the frame of the cooking appliance or toaster. This arrangement of cooperating parts is attended by relatively serious drawbacks in assembly and operation and the advantages inherent in my approved construction and assembly will be hereinafter pointed out.

In the drawings,

Figure 1 is a view, in side elevation, with parts cut away, of a toaster having associated herewith the unitary thermally-responsive timing mechanism embodying my invention, Fig. 2 is a view, in side elevation, in one form of device embodying my invention, Fig. 3 is a fragmentary view in side elevation of a modified form of bracket arm and bimetal element, Fig. 4 is a view, in side elevation, of another form of device embodying my invention, Fig. 5 is a view, in side elevation, of another form of device embodying my invention, Fig. 6 is a view, in rear elevation, of the device shown in Fig. 5, Fig. 7 is a view, in side elevation, of the device shown in Fig. 5, as seen from the opposite side, Fig. 8 is a view in side elevation, of another form of device embodying my invention, Fig. 9 is a view in side elevation, of still another form of device embodying my invention, Fig. 10 is a view in side elevation, of yet another device embodying my invention, Fig. 11 is a view in side elevation, of still another form of device embodying my invention, and, Fig. 12 is a view in rear elevation, of the device shown in Fig. 11.

Referring first of all to Fig. 1 of the drawings, I have there shown a toaster 21 which includes a suitable base 23, a casing 25 on the base provided with a cover 27, which cover may be provided with one or more openings therein through which a slice or slices of bread may be inserted in and removed from the toaster to be toasted within the casing. The toaster includes, further, pairs of electric heating elements 29 which are positioned in opposed vertically-extending relation within the casing to apply heat to both sides of a slice of bread at the same time. Baffle plates 31 are located between the side walls of the casing 25 and the flat extended heating elements 29, in a manner now well known in the art. The toaster includes also an intermediate front wall 33 which divides the space within the casing into a mechanism chamber 35 and into a toasting chamber defined at least in part by wall 33 and the plurality of opposed heating elements 29.

Means not shown in these drawings include a support for slices of bread movable into toasting and non-toasting position relatively to the heating elements, which supports are adapted to move vertically and are biased to their upper or non-toasting position and adapted to be moved manually downwardly by a knob 37 and adapted to be held in their lower or toasting position by pivotally mounted latch means 39 shown more particularly in Figs. 6 and 12 of the drawings. The above described toaster structure is old and well known in the art and is not claimed as part of my invention.

The mechanism more particularly embodying my invention and adapted to cause release of the latch and the return of the bread slice support to its non-toasting position, will now be described and it is to be understood that, as is now well known, in devices, particularly toasters of this kind, the supply of current to the heating elements 29 is interrupted simultaneously with the upward movement of the bread slice support, by the same mechanism.

A spring driven mechanical timer designated generally by numeral 41 in Figs. 2 and 4 of the drawings, includes a spring 43 adapted to be wound up by the downward movement of knob 37 after which the spring unwinds driving a gear train shown generally only in 45 in Fig. 2 of the drawings and adapted to cause oscillating movement of a link or oscillator 47 which has an adjustable, pivotal mounting at 49. The pivotal mounting 49 is supported on and may be moved by a speed adjusting member 51, which may be of substantially L-shape and movement of which either manually, as by a knob 53 (see Fig. 1) or by any other agency, against a means biasing it upwardly into slow speed position will cause a variation in the speed of oscillation of a balance wheel 55 to thereby vary the duration of an operating period of the timer, that is, the length of time between the downward movement of knob 37 and latching of the mechanism by latch 39, and release thereof after a time interval. Since a device of this kind, shown as manually actuable, already is disclosed and claimed in my issued Patent No. 1,866,808, assigned to the same assignee as is the present application, further description of this mechanical timer is believed to be unnecessary.

It is obvious that it is highly desirable in a cooking appliance of this kind, particularly a toaster, that the duration of an operating period be varied in accordance with the temperature of the cooking appliance or toaster. In order to effect this control I provide, as shown in Figs. 1 and 2 of the drawings, a bimetal bar 57 which extends away from the mechanical timer 41 and has its remote end supported by a bracket arm 59, one end of which is secured to one side of the frame or structure of the mechanical timer. I prefer to make the mass of the bracket arm 59 relatively small and I so arrange the bimetal bar that its flexing movement is in a plane substantially parallel to the side of the timer 41 and, when the assembly is mounted in a toaster as shown in Fig. 1, the bimetal bar will flex in a direction parallel with the heating element. At that end of the bimetal bar 57 adjacent to the timer, there is provided an extension arm 61 having an angularly extending cam-surface 62, one edge of which is adapted to engage the speed adjusting member 51 when the bimetal bar flexes downwardly because of a rise of temperature of the toaster. The shape of cam surface 62 is such as to cause a speed change in the timer which is less for higher temperature ranges than for lower temperature ranges.

As shown in Fig. 1 of the drawings the bracket arm 59 is provided with a depending stop lug 65 located in the path of travel of the bimetal bar 57 when the same is subjected to an increase of ambient temperature to reduce the extent of movement of the free end of the bimetal bar 57 at higher temperature ranges to insure a smaller speed change at higher temperature ranges than at lower temperature ranges. It is to be understood that I may use either or both means for obtaining a reduced effect at higher temperature ranges.

Fig. 2 of the drawings illustrates the unitary thermally-responsive mechanical timer by itself and several of the details differ from those shown in Fig. 1. Thus the stop lug in the path of travel of the heated bimetal bar is omitted and an extension 63 is secured to the near (free) end of bimetal bar 57, which extension has an angularly extending portion or cam surface 66 adapted to engage the speed adjusting member 51, to cause a disproportionate change of speed with changes of temperature.

Referring now to Fig. 3 of the drawings, I have there illustrated a modified form of stop lug as comprising a resilient bar 67, the free end of which is located in the path of travel of an intermediate portion of the bimetal bar 57.

Referring now to Fig. 4 of the drawings, I have there illustrated a mechanical timer 41 of the same kind as shown in Fig. 2 of the drawings, having secured thereto a relatively short bracket arm 69 which supports a vertically-extending bimetal bar 71 which bar depends from the bracket 69 and has secured thereto at its lower end an arm 70 having an angularly extending cam surface 72 thereon adapted to engage the speed adjusting member 51 of the mechanical timer.

Referring now to Figs. 5, 6 and 7 of the drawings I have there illustrated a mechanical timer 73 which may be of substantially the same general type as timer 41 but which is not designed and adapted to have its speed varied by a thermally-actuable element. In other words, it is a constant speed timer and the parts to be controlled by a thermally-actuable element in order to effect release of the latch 39 after a variable shorter time interval with increase in toaster temperature, are somewhat different. I provide a bracket arm 75 having one end secured to the timer frame and having its other end located away therefrom. A bimetal bar 77 having one end secured to the remote end of arm 75 and extending toward the timer. A hook 79 is secured to the free end of the bar 77 and engages a hooked link 81 which, in turn, is pivotally connected to one end of a lever arm 83 pivotally mounted on the rear side of the frame of timer 73. The other end of arm 83 engages one end of a lever arm 85 pivotally supported intermediate its ends, the other end of arm 85 having a pivotal connection with a curved arm or member 87, the other end of which is pivotally mounted on latch 39. When knob 37 is moved downwardly, a means associated therewith engages a pin 89 on a vertically movable rack bar 91 (shown also in Fig. 1 of the drawings) which rack bar engages a pinion 93 to cause winding up of the spring 43, the rack bar 91 being adapted to move vertically in a slide 95. The means associated with the knob 37 for winding up the spring forms no part of my present invention, but is old and well known in the art. It is illustrated and described in my earlier Patent No. 2,001,362, in Lucia Patent No. 2,036,178 and in Graham Patent No. 2,039,956, all of these patents being assigned to the same assignee as is the present application, and reference may be had to these patents for further details of this means. While I have shown a bimetal bar applied to timer 73 it is understood that I may use other forms of thermally-actuable elements as shown in other figures of the drawings.

Referring now to Fig. 8 of the drawings I have there illustrated a variable speed mechanical timer 41 of the same general kind as shown in Fig. 2 of the drawings but in which a relatively short bracket 97 supports a spiral bimetal bar 99, to the movable end of which is secured an arm 101 having a cam surface 103 adapted to engage the speed adjusting member 51 of the timer.

Referring to Fig. 9 of the drawings I have there illustrated a variable speed timer 41 having mounted thereon a bracket arm 105 adapted to support an expansion rod 107, which expansion rod has one end fitting over a sharp point 109 held by an adjusting screw 111, the other end of the rod being adapted to fit into a recess 113 in the short arm of a bell crank lever 115 pivotally mounted at 117 on the timer frame. A link 119 has one end pivotally connected to the long arm of lever 115 while its other end is connected to a cam member 121 which is pivotally mounted at 123 and has an angularly extending cam surface 125 adapted to engage a speed adjusting member 51. A biasing spring 127 may be connected to member 121 to maintain the parts in proper operative positions relatively to each other and normally in the positions shown in Fig. 9, a stop pin 128 being provided if desired.

Referring now to Fig. 10 of the drawings I have there shown a variable speed mechanical timer 41 having a bracket arm 129 mounted thereon which bracket arm has a depending portion 131 adapted to support an adjustable screw 133 which engages with and supports one end of a "Sylphon" bellows 135, the other end of which has an extension which engages the short arm of a bell crank lever 137 pivotally mounted on the timer frame at 139. A link 141 is pivotally connected with the other arm of bell crank lever 137 and is pivotally connected with a cam arm 143 pivotally mounted at 145, a biasing spring 147 being connected therewith to ensure that the thermally-actuable members shall remain in proper operative positions relatively to each other under all conditions of operation and normally in the positions shown in Fig. 10. Member 143 is provided with a cam surface 149 adapted to engage with speed adjusting member 51.

Referring now to Figs. 11 and 12 of the drawings I have there illustrated a variable speed timer 41 with which is associated a bimetal bar 151 supported by a bracket arm 153 in such manner as to be adapted to move in a path substantially at right angles to the plane of the sides of the mechanical timer and so that its wider surface or face is subjected to heat from the adapter and more particularly from the toasting chamber transmitted through the baffle plate 31. A cam member 155 with a cam surface 157 is provided, the cam surface 157 being adapted to engage a speed adjusting member 159 the action of which is the same as that of speed adjusting member 51. It may be pointed out that if the bimetal bar 151 moves away from the heating element with increase in temperature, there will be a tendency for the flexing action to decrease with increased flexing of the bimetal carrying a portion thereof farther away from the heating element.

Referring first of all to Fig. 2 of the drawings and to the other figures of the drawings showing variable speed mechanical timers, it is obvious that my inventive concept may be embodied in a wide variety of devices, particularly as to the thermally-actuable element and while I now prefer to use a bimetal bar, it is obvious that my invention is not limited thereto.

The design and construction of bimetal bar 57 in Fig. 2 of the drawings is such that when subjected to an increase in temperature, such as will occur when the toaster 21 is energized, the bar 57 will move downwardly and ultimately the surface or edge 66 will engage speed adjusting member 51 and move it to cause an increase in the speed of oscillation of balance wheel 55 with a resultant decrease in the length of time of an operating period of the toaster. It may here be pointed out that the operating period of the timing mechanism is the same as the operating period of the toaster. Since the time and temperature curve of heated appliances and particularly of a toaster is not a direct function of time and energy input, it is necessary that a disproportionate change in speed and decrease in duration of the operating period be obtained and the stop lug 65 of Fig. 1 of the drawings or the stop lug 67 of Fig. 3 of the drawings be utilized, and this means has already been disclosed and claimed in my issued Patent No. 2,077,627, dated April 20, 1937, and assigned to the same assignee as is the present application.

Referring now to Figs. 5, 6 and 7 of the drawings where I have illustrated a constant speed mechanical timer, it is obvious that a downward flexing movement of bimetal bar 77 will result in a downward movement of curved member 87 thereby causing it to be engaged earlier by the upwardly moving pin 89 with the result that the latch 39 is released earlier than would be the case if bimetal element 77 had not been subjected to an increased temperature. In this case the operating period of the toaster may not be the same as the normal operating period of the mechanical timer.

While I have shown a specific embodiment of means applied to a constant speed mechanical timer for effecting release of a latch earlier when the toaster is hot than when it is cold, I do not desire to be limited to the specific form shown since it has been shown for illustrative purposes only and any other means effective for the same purpose may be utilized by me and is to be considered as being covered in the claims. The mechanical timer, which may be held by a securing means 161 (see Fig. 1 of the drawings), is adapted to be located in the mechanism chamber while the bimetal bar 57 extends away therefrom out of close heat interchanging relation with the timer, and is adapted, when mounted in a toaster in the manner shown in Fig. 1 of the drawings, to be subjected to transmitted heat from the heating means. The combination of a unitary timer as shown in Fig. 2 of the drawings with a toaster is more particularly disclosed and claimed in my co-pending application, Ser. No. 128,403, filed as even date herewith and assigned to the same assignee as is the present application.

Some of the advantages of a unitary structure of a thermally-responsive mechanical timer of this kind may be briefly set forth: It is possible to assemble the unitary structure, including the mechanical timer and its cooperating thermally-actuable element, before its incorporation in the device which it is to control; it is possible to test and properly adjust the thermal element before the assembly is mounted in a toaster; there is much less possibility of shifting or movement of the thermal element relatively to the speed adjusting member 51 than would be the case if the thermal element were mounted in and supported by the toaster frame or structure; the speed changing parts of the timer are relatively simple.

Instead of using an angularly extending cam surface adapted to engage the speed adjusting member, I may use a straight bar to obtain a proportionate change in speed of the timer. I may use any one or a plurality of these means with any one of these different devices as may be found necessary or desirable. Since the time-temperature curve of a toaster is a relatively complicated curve, it has been found necessary to provide means such as these to ensure that the speed change in a variable speed mechanical timer of this kind with a given change in temperature shall be less at higher temperature ranges than at lower temperature ranges.

Various modifications may be made in the device here disclosed and described without departing from the spirit and scope of my invention and I desire therefore that only such limitations shall be placed thereon as are set forth in the appended claims or are imposed by the prior art.

I claim as my invention:

1. A unitary thermally-responsive timing mechanism adapted to cause other mechanism to operate after a time interval and comprising a constant speed mechanical timer, a latch means on the timer, means supported solely on and actuated by the timer adapted to move said latch after a time interval to cause said other mechanism to operate, a bracket supported solely from the timer and a bimetal member fixedly supported solely from the bracket out of close heat interchanging relation with the timer adapted to act on said latch-moving means to vary the duration of said time interval in accordance with changes in temperature of the thermally-actuable means.

2. A unitary thermally-responsive timing mechanism for causing other mechanism to operate after a time interval and comprising a mechanical timer, a bracket immovably secured to said timer and supported solely thereby, a thermally-actuable element fixedly mounted on said bracket out of close heat-interchanging relation with said timer and means on said timer actuable by said thermally-actuable element and constructed and arranged to cause the timing mechanism to provide a shorter time interval when the thermally-actuable element is hot than when it is cold.

3. A unitary thermally-responsive timing mechanism for causing other mechanism to operate after a time interval and comprising a mechanical timer, a bracket immovably secured to said timer and supported solely thereby, a bimetal element fixedly mounted on said bracket out of close heat-interchanging relation with said timer and means on said timer actuable by said bimetal element and constructed and arranged to cause the timing mechanism to provide a shorter time interval when the bimetal element is hot than when it is cold.

4. A unitary thermally-responsive timing mechanism for causing other mechanism to operate after a time interval and comprising a mechanical timer, a bracket immovably secured to said timer and supported solely thereby, a thermally-actuable element fixedly mounted on said bracket out of close heat-interchanging relation with said timer and means on said timer actuable by said thermally-actuable element and constructed and arranged to cause the timing mechanism to vary the time interval provided thereby in accordance with the temperature of said thermally-actuable element.

5. A unitary thermally-responsive timing mechanism adapted to cause other mechanism to operate after a time interval and comprising a variable speed mechanical timer having a lever arm thereon constructed and connected with the timer to cause a change in its operating speed when moved, a thermally-actuable element for operatively engaging said lever arm to vary the speed of the timer and the length of said time interval in accordance with changes in temperature of the thermally-actuable element and a bracket fixedly mounted on said timer and constituting the sole support for the thermally actuable element, said bracket supporting the thermally-actuable element out of close heat interchanging relation with said timer.

6. A unitary thermally-responsive timing mechanism adapted to cause other mechanism to operate after a time interval and comprising a variable speed mechanical timer having a lever arm thereon constructed and connected with the timer to cause a change in its operating speed when moved, a bimetal element for operatively engaging said lever arm to vary the speed of the timer and the length of said time interval in accordance with changes in temperature of the bimetal element and a bracket fixedy mounted on said timer and constituting the sole support for the bimetal element, said bracket supporting the bimetal element out of close heat-interchanging relation with said timer.

7. A device as set forth in claim 5 and including a member movable by the thermally-actuable element and having a cam surface thereon for engaging said lever arm to move the same, said cam surface being so shaped as to cause a change in speed of the mechanical timer that is disproportionate to the change in temperature and the movement of the thermally-actuable element.

8. A device as set forth in claim 5 and including a member movable by the thermally-actuable element having a cam surface engageable with said lever arm to move the same, said cam surface being so shaped as to cause the change in speed of the timer for a given temperature variation to be less at higher temperature ranges than at lower temperature ranges.

9. A device as set forth in claim 6 and including a member secured to the movable end of the bimetal element, said member having a cam surface engageable with the lever arm to move the same, said cam surface being such that the speed change of the timer for a given temperature variation shall be different for the same amount of temperature variation at different temperature ranges.

10. A device as set forth in claim 6 and including a cam secured to the movable end of the bimetal element having a surface engageable with the lever arm to move the same incident to temperature changes, said cam surface being so shaped that the changes in speed of the timer for a given temperature variation shall be less at higher temperature ranges than at lower temperature ranges.

11. A unitary thermally-responsive timing mechanism adapted to cause other mechanism to operate after a time interval and comprising a variable speed mechanical timer having a lever arm thereon constructed and arranged to cause a change in speed of the timer when moved, a bracket fixedly mounted on and supported solely by the timer, a bimetal element having one end fixedly secured to said bracket and supported solely thereby, the bimetal element being out of close heat interchanging relation to said timer, the bimetal element being adapted to operatively engage said lever arm on predetermined increase of its temperature to move the same and thereby increase the speed of the timer and a plurality of means on the timing mechanism for causing the speed change for a given temperature variation to be less at higher temperature ranges than at lower temperature ranges, said means including a member on the movable end of the bimetal element engageable with the lever arm, the engaging surface of said member being so shaped that the amount of turning movement of the lever arm affected by the moving bimetal element is less than the amount of movement of the free end of the bimetal element and a stop lug supported by said bracket in the path of movement of the bimetal element when heated and engageable with an intermediate portion of the bimetal element on predetermined increase in its temperature.

MURRAY IRELAND.